Jan. 13, 1959    H. L. BROWNE ET AL    2,867,843
APPARATUS FOR COMPACTING FINELY DIVIDED SOLIDS
Filed Jan. 10, 1955    4 Sheets-Sheet 1

INVENTORS
HAROLD L. BROWNE
OWEN C. COOKINGHAM
DONN W. PENDLETON
BY
Robert F. Fleming Jr.
ATTORNEY INVENTORS
HAROLD L. BROWNE
OWEN C. COOKINGHAM
DONN W. PENDLETON
BY Robert F. Fleming Jr.
ATTORNEY INVENTORS
HAROLD L. BROWNE
OWEN C. COOKINGHAM
DONN W. PENDLETON
BY Robert F. Fleming Jr.

ATTORNEY

INVENTORS
HAROLD L. BROWNE
OWEN C. COOKINGHAM
DONN W. PENDLETON
BY Robert F Fleming Jr.
ATTORNEY Patented Jan. 13, 1959

2,867,843

APPARATUS FOR COMPACTING FINELY DIVIDED SOLIDS

Harold L. Browne and Owen C. Cookingham, Midland, and Donn W. Pendleton, Beaverton, Mich., assignors to Dow Corning Corporation, Midland, Mich., a corporation of Michigan Application January 10, 1955, Serial No. 480,900

6 Claims. (Cl. 18—1)

This invention relates to an apparatus for compacting and pelletizing finely divided solids especially those having bulk densities of less than 5 pounds per cubic foot.

Finely divided solids such as various forms of synthetic silicas and carbon black are widely employed in industry for various applications such as reinforcing fillers for elastomers and flatting agents in paints. As a result of these uses large volumes of these materials are handled annually. The handling of these finely divided solids, i. e., materials having bulk densities of less than 5 pounds per cubic foot and especially those of the order of less than 2 pounds per cubic foot poses many problems. In the first place, due to the extremely low densities of the material a large storage space is required and bulky containers are needed for shipping. Also in view of the buoyancy of the fine particles a considerable dusting problem is encountered when the solids are incorporated in other materials as, for example, in milling operations wherein fillers are incorporated in elastomers. This creates both an economic loss and unpleasant working conditions.

One method which has been suggested for solving this problem is to coat the solid with a slightly adhesive material which will then cause it to coagulate into coarse particles which are essentially dust free. Whereas this procedure is suitable for some uses it is not suitable where the material is to be used as a filler in elastomers particularly in siloxane elastomers. Consequently, a mechanical process which will give the desired compaction without any coating is greatly desired.

It is the primary object of this invention to provide a novel apparatus for pelletizing finely divided solids whereby these solids can be economically handled. Another object is to provide an apparatus which will economically compress finely divided solids into a form which can be handled with no appreciable dusting. Another object is to decrease the storage space and shipping space necessary for the finely divided solid materials. Other objects and advantages will be apparent from the following description.

In accordance with this invention a finely divided solid is converted into substantially dust-free pellets by the steps of (1) preliminarily compressing the solid so that substantially all of the air between the particles is expelled, (2) subsequently compressing the solid to a bulk density of at least 4 pounds per cu. ft. and (3) thereafter tumbling the compressed solid for a time sufficient to form pellets which are substantially dust free.

It can be seen that essentially the process of using this invention involves a compression step followed by a tumbling step. The compression step may be divided into two portions, namely, a deaeration of the material followed by compaction to a density of at least 4 pounds per cu. ft. and preferably 5 lbs. per cu. ft. The deaeration step involves crowding the particles together under conditions whereby the free air between the particles is expelled and is allowed to escape. This deaeration step may be done in any suitable manner but the preferred method is to carry out the compression in a substantially closed system composed at least partly of an air permeable material through which the air can escape.

The compaction of the solid is accomplished by applying pressure thereto by any suitable means. This can be done in a press or more economically by passing the material through squeeze rolls. After the compaction to the above-defined bulk density, the solid material is usually in the form of flakes.

The compacted material is then tumbled in a suitable container until the flakes are converted into rounded pellets which are substantially dust free. In general, if the solid has been compressed to 5 lbs. per cu. ft. bulk density, a tumbling for 10–15 minutes is usually sufficient to form satisfactory dust-free pellets. If the density is less than 5 lbs. per cu. ft., longer tumbling is necessary. The tumbling operation may be shortened by seeding the batch with previously formed pellets.

The process of this invention may be carried out either stepwise or continuously, i. e., the material may be first compacted to the desired bulk density and thereafter transferred to a suitable apparatus for tumbling into pellets. Alternatively the operation may be carried out continuously whereby the bulk material is fed into the deaeration station and thereafter to a compacting station and subsequently to a tumbling station from which the pellets are continuously removed. These operations can be carried out in any desirable apparatus.

The best apparatus for the purpose of this invention is one of the type shown in the accompanying drawings in which.

Figure 1:
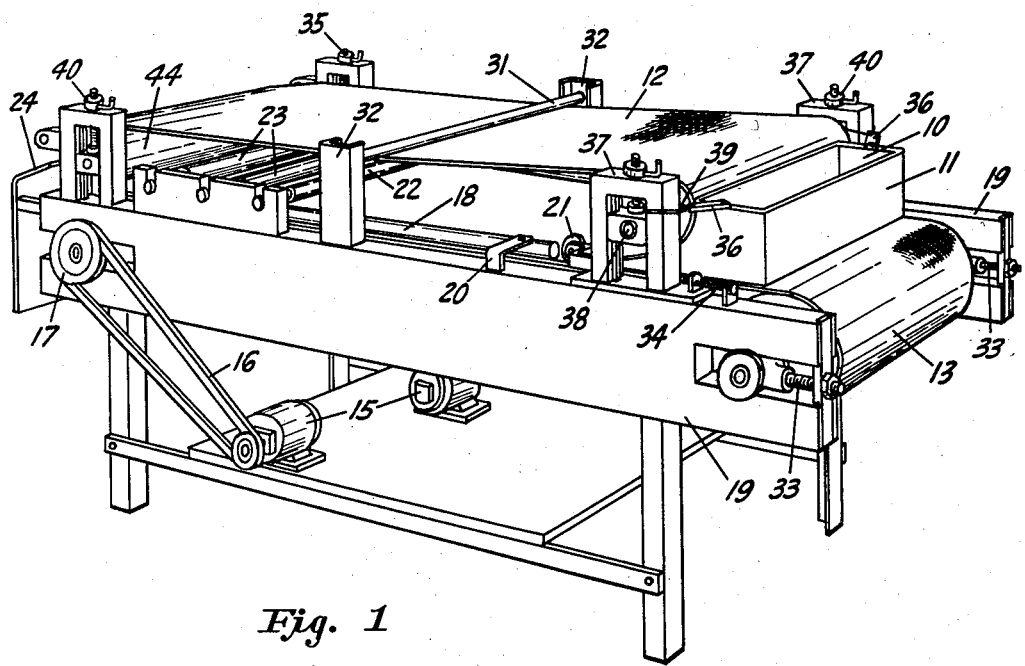
Fig. 1 is a projection of one embodiment of the compression apparatus of this invention.
Figure 2:
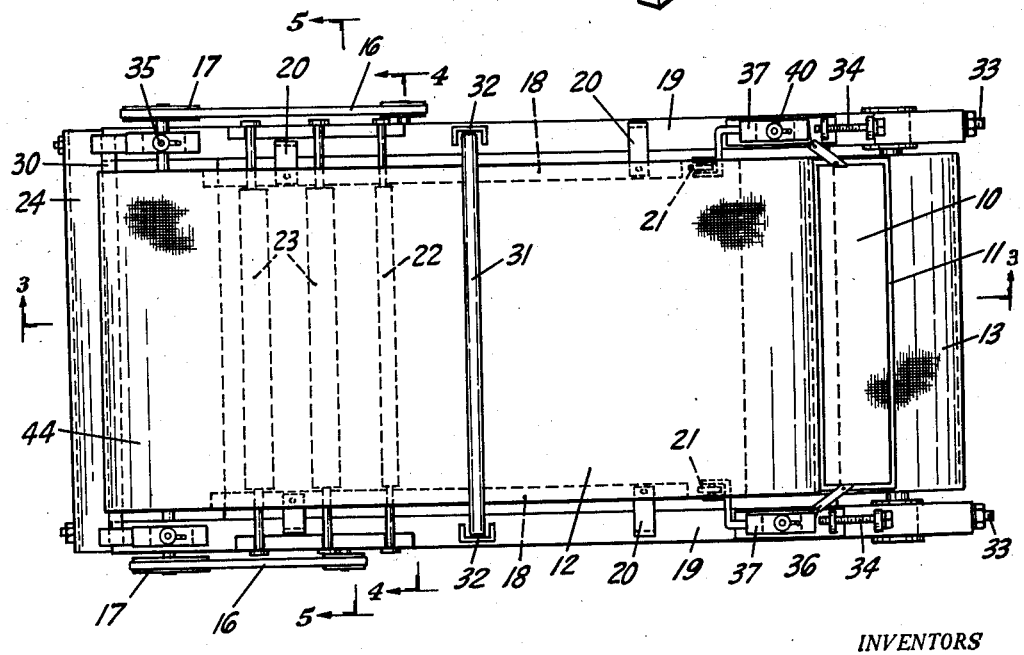
Fig. 2 is the top view of the apparatus of Fig. 1.
Figure 3:
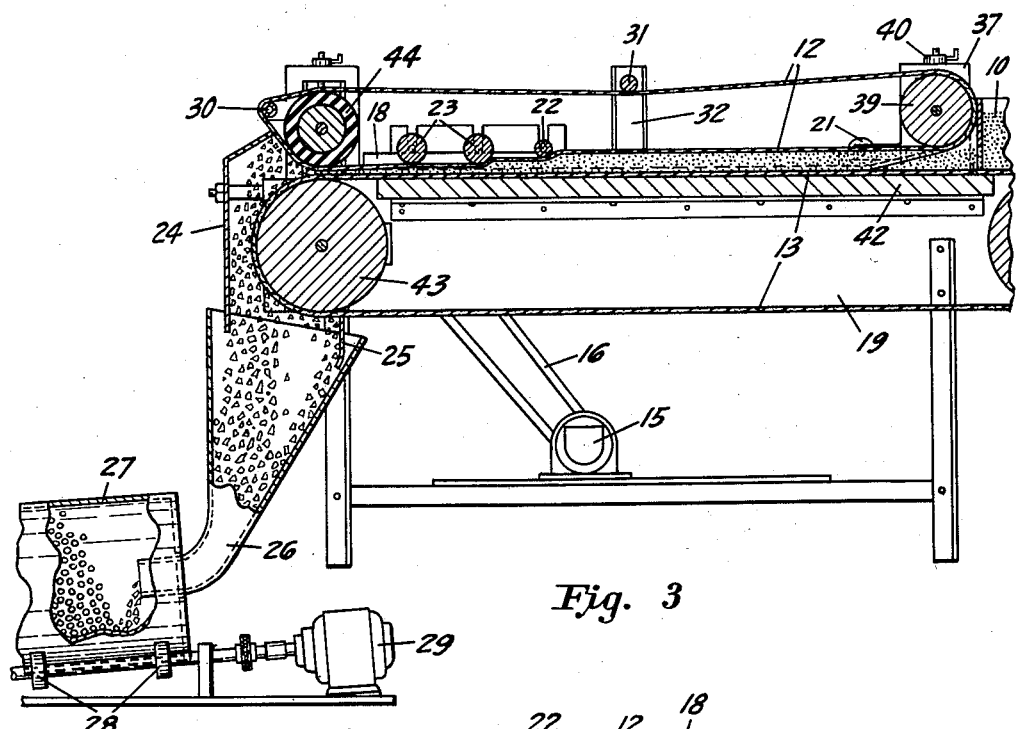
Fig. 3 is a side view of the apparatus of Fig. 2 sectioned along the line 3—3. (In this figure the tumbling apparatus is also shown.)
Figure 6:
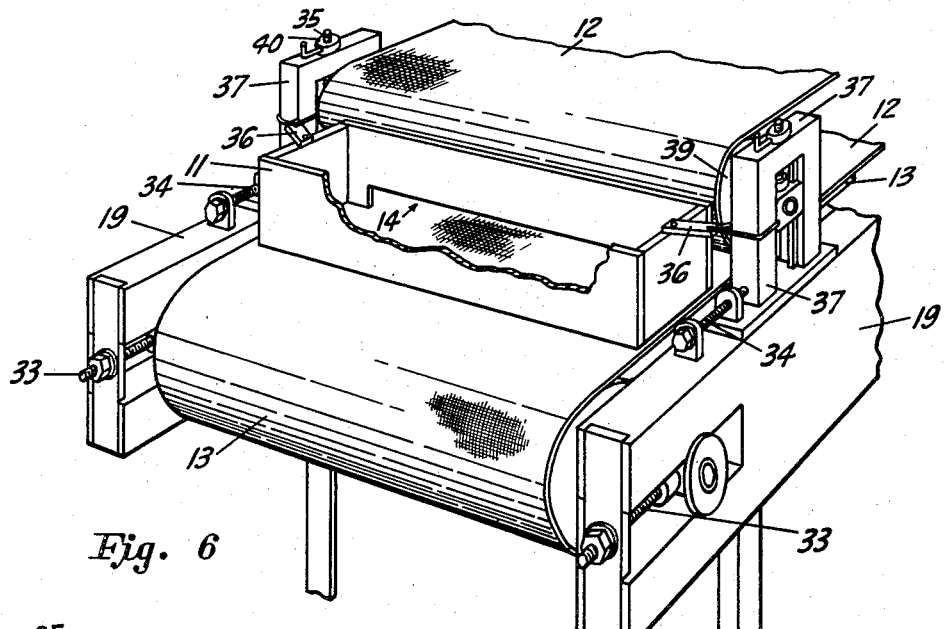
Fig. 6 is an end view of the apparatus of Fig. 1 showing details of the feed means and the adjustment means for the idle rolls and Fig. 7 is a detailed view of the squeeze roll assembly of the apparatus of Fig. 1.

The drawings represent an apparatus for continuously compressing and pelletizing finely divided solid materials, i. e., a fume silica prepared by burning a volatile silane. With reference to Figs. 1, 2 and 3, a finely divided solid 10 is fed into hopper 11. Hopper 11 is without a bottom and rides directly on rotating endless conveyer 13. The hopper is provided with a slot 14 as shown in Fig. 6. Thus the solid comes in contact through this slot with rotating upper endless conveyer 12. The conveyers 12 and 13 are driven by means of squeeze rolls 44 and 43. The power to the squeeze rolls is supplied by means of motors 15 through belts 16 and drive wheels 17. The squeeze rolls rotate in opposite directions so that the adjacent faces of the conveyers will travel in the same direction from the hopper to the squeeze rolls.

Figure 4:
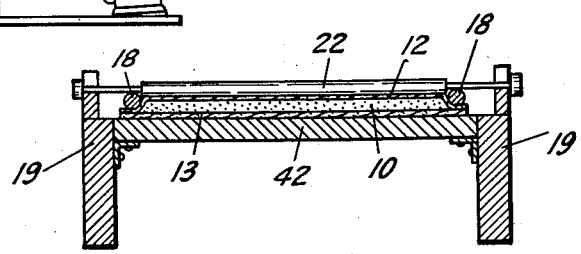
Fig. 4 is a view of part of the apparatus of Fig. 2 sectioned along the line 4—4.
Figure 5:
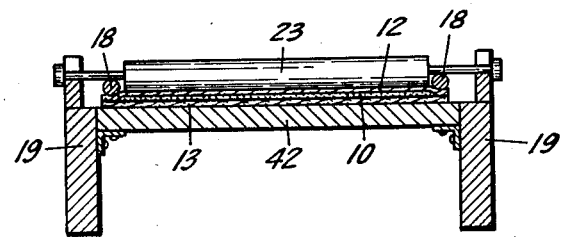
Fig. 5 is a view of part of the apparatus of Fig. 2 sectioned along the line 5—5.

Solid 10 travels between the adjacent faces of the conveyers. The upper conveyer 12 passes beneath rollers 21 and runners 18, the latter being fastened to frame 19 by means of arms 20. The rollers 21 and the runners 18 are so positioned with respect to support platform 42 that the edges of the upper conveyer are held against the lower conveyer throughout most of the distance between the hopper and the squeeze rolls. This seals the edges of the conveyer and prevents the escape of the solid material. The function of these members is more clearly shown in Figs. 4 and 5.

As the conveyers progress toward the squeeze rolls the upper conveyer passes under idle rolls 22 and 23. These rolls serve two functions, first they prevent billowing of the upper conveyer as it approaches the squeeze rolls and second, the idle rolls 23 serve to deaerate the solid material by forcing the upper conveyer close to the lower one thereby crowding the particles of the solid in close proximity to each other so that substantially all of the air between the particles is expelled. The expelled air escapes through conveyer 12 which should be of a porous material permeable to air but not to the solid particles. No. 4 or No. 10 canvas duct is suitable for use as conveyer 12. A sample of No. 4 canvas duct 36" by 22" weighs 15 ounces while an identical size sample of No. 10 duct weighs 9 ounces.

Figure 4A:
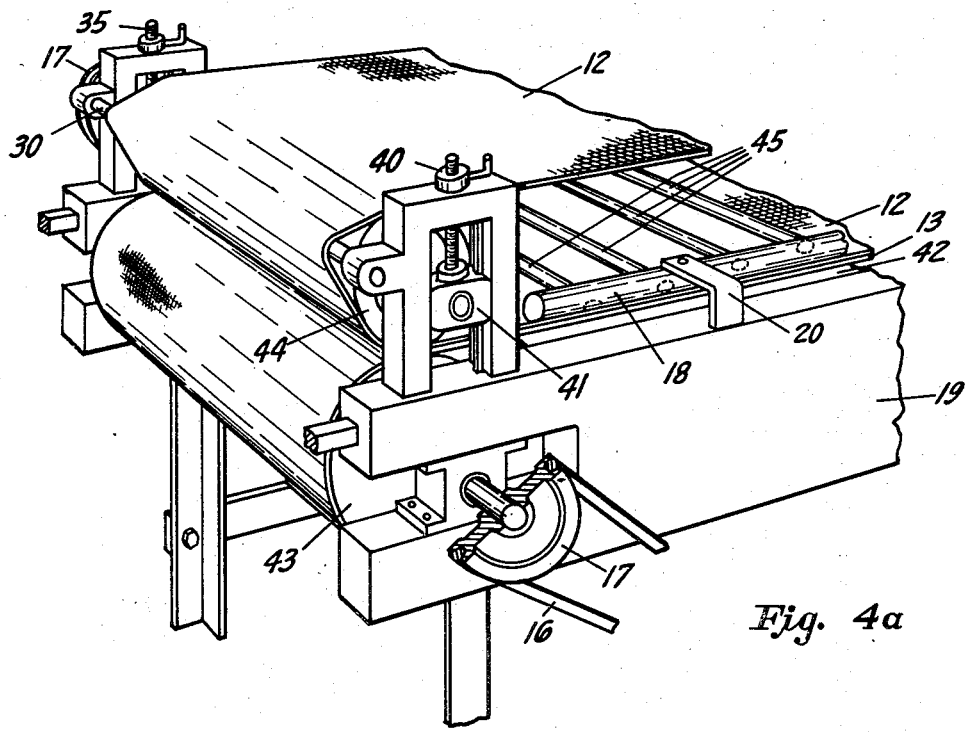
Figs. 4a and 4b show views of part of the apparatus of Fig. 1 having alternative deaeration assemblies.

Fig. 4a shows a modification of the deaeration assembly in which lateral bars 45 are attached to runners 18. These bars are fastened in positions progressively closer to the support platform 42 and thereby force conveyer 12 into close proximity to conveyer 13 as they move towards the squeeze rolls.

Figure 4B:
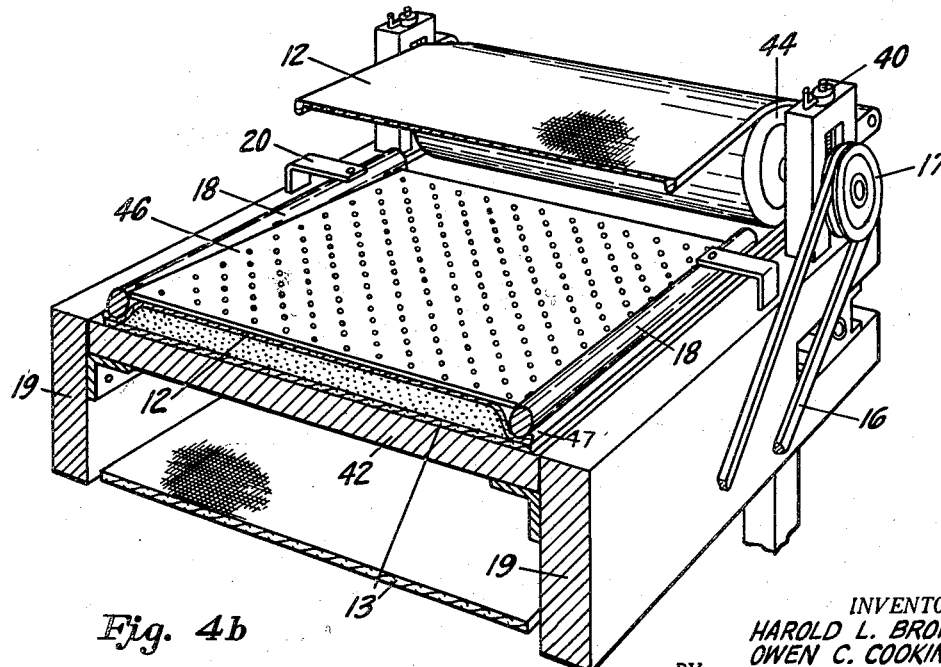

Fig. 4b shows a third modification of the deaeration assembly in which porous plate 46 serves as the deaeration member. The air expelled from the solid escapes through the holes in the plate. Instead of being rigidly fixed in sloping relationship to the support platform as shown in the drawing, the plate may be pivotally mounted on runners 18 or on frame 19 so that the slope of the plate can be adjusted as desired.

If desired upper conveyer 12 may be supplied with a bead 47 along each edge thereof as shown in Fig. 4b. The beads ride along the outer edge of runners 18 and act as a guide to keep the conveyer from wandering on the rolls. The beads may be of any flexible material. One suitable material is silicone rubber.

Lower conveyer 13 can be of any suitable material. A four-ply canvas duct is one example of a suitable material.

The conveyers carrying the deaerated solid then pass between squeeze rolls 43 and 44 which are adjusted so as to compress the solid to a bulk density of at least 4 pounds per cu. ft. and preferably 5 lbs. per cu. ft. It has been found preferable to have lower squeeze roll 43 of different diameter than upper squeeze roll 44. The precise ratio of the diameters of the rolls is not critical so long as that of 43 is different from 44. For example, it has been found that excellent results are obtained when the diameter of the lower roll is about twice that of the upper although it is immaterial which roll is larger.

It has also been found desirable to have at least one roll coated with a rubber-like material. This facilitates compaction and speeds up the operation of the equipment thereby allowing a greater rate of production of compressed material. Although the drawings show the upper roll coated with rubber either the upper or the lower or both may be coated. Preferably the rubber should have a durometer of less than 90.

After passing between the squeeze rolls the pressed material is scraped from the conveyer surfaces by means of plates 24 and 25 both of which are fastened to frame 19. The solid material then falls down chute 26 and into rotating cylinder 27 where it is tumbled for a length of time needed to convert the flaked material into dust-free pellets. Cylinder 27 is rotated by means of friction drive wheels 28 which are in turn driven by motor 29.

In the operation of the apparatus above-described it has been found desirable but not essential to pass the conveyer 12 around idle roll 30 in order to provide a more efficient scraping surface for removal of the compressed solid. Conveyer 12 then passes under idle roll 31 which rotates in slots 32 and rides upon the conveyer. This roll is not essential but it prevents flapping of the conveyer and facilitates operation.

With reference to Fig. 6 the tension on conveyers 12 and 13 is adjusted by means of screws 33 and 34. Screw 34 is fastened to posts 37 which carry the bearing for idle roll 39. Posts 37 are slidably mounted on frame 19 and are thus moved backward and forward by adjusting screw 34. The elevation of idle roll 39 is adjusted by a turning nut 40 which rides on screw 35 and raises or lowers bearing 38 of idle roll 39.

Lateral movement of feed hopper 11 is prevented by means of arms 36 which are attached to posts 37.

Figure 7:
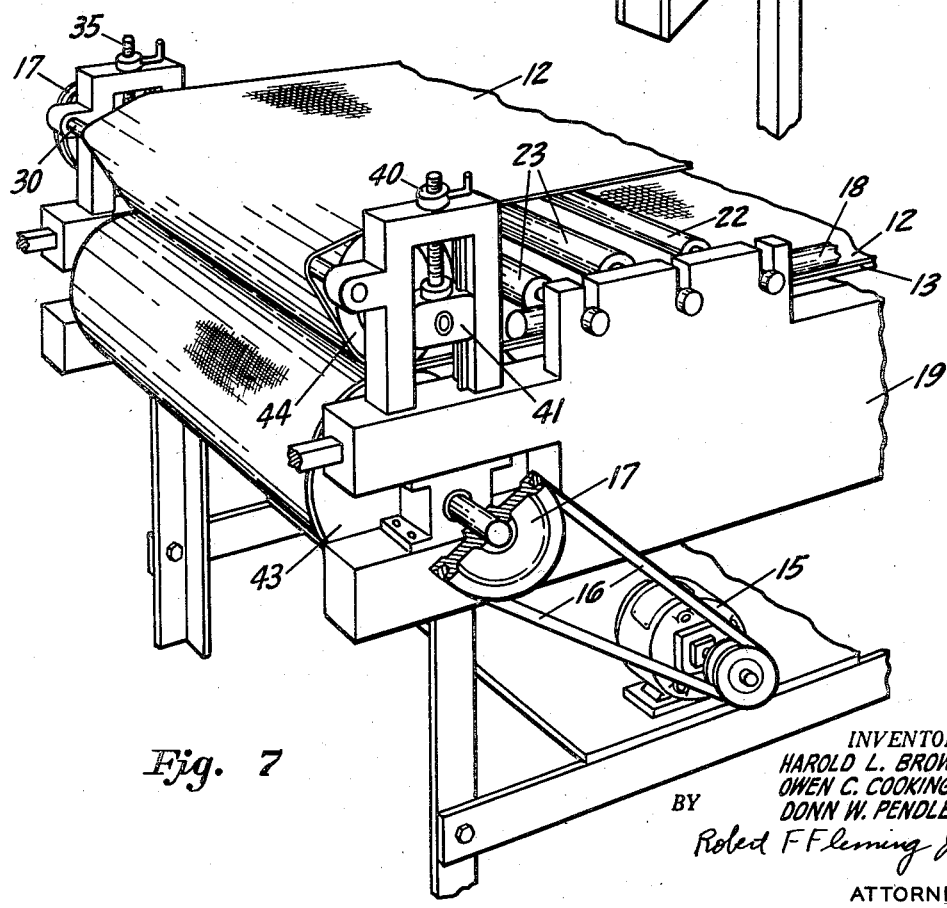

For better understanding of the adjustment mechanism of squeeze rolls 43 and 44 reference should be had to Fig. 7. The pressure between the rolls is adjusted by raising or lowering squeeze roll 44 which is done by turning nut 40. This causes adjustable bearing 41 to slide up or down between posts 37 thereby bringing the rolls closer together or moving them further apart as desired.

Various modifications of the apparatus above described can be made without departing from the scope of this invention. For example, the conveyers 12 and 13 may be operated in a vertical position rather than a horizontal one. One of the conveyers may be made to undergo a reciprocating motion relative to the other thereby deaerating the solid by positive pressure. Many other modifications will be apparent to those skilled in the art.

The apparatus of this invention has made possible the production of compacted pellets of finely divided materials, particularly finely divided silicas, which substantially reduces the cost of handling these materials. The pellets produced by the apparatus for this invention are sufficiently strong that the material can be shipped without rupturing the pellets especially if they are shipped in rigid containers such as fiber cartons or metal drums. The pellets can be conveniently stored in a fraction of the spaced required for the unpelletized material. They can also be employed in milling and other mixing operations wherein the solid is used without causing an appreciable amount of dusting in the vicinity of the operation. For this reason the method of this invention represents a substantial contribution to the silica art.

That which is claimed is:

1. An apparatus for compressing a finely divided solid comprising squeeze rolls, two endless conveyers positioned face to face one above the other so that the adjacent faces are substantially parallel laterally, at least one of which conveyers is pervious to air, said conveyers passing between and being driven by the squeeze rolls, means for feeding finely divided solid between the adjacent faces of the conveyers, a rigid member adjacent to and parallel the edges of the upper conveyer, said member being so positioned that it holds the edges of the upper conveyer against the lower from a point adjacent to where the solid is fed to a point adjacent the squeeze rolls, a series of rigid members extending laterally across the upper conveyer and so positioned that they force the upper conveyer against the adjacent face of the lower conveyer thereby deaerating the solid between the adjacent conveyer surfaces and means for removing the compressed solid from the conveyers after it has been compressed by passing between the squeeze rolls.

2. An apparatus for compressing a finely divided solid comprising squeeze rolls, two endless conveyers positioned face to face one above the other so that the adjacent faces are substantially parallel laterally, at least one of which conveyers is pervious to air, said conveyers passing between the squeeze rolls which serve to drive the conveyors, means for feeding a finely divided solid between the adjacent faces of the conveyers, a rigid member extending parallel to and adjacent each edge of the upper conveyer and so positioned that the edges of the upper conveyer are forced against the adjacent face of the lower conveyer thereby forming a seal from a point adjacent the point of feed of the solid to a point adjacent the squeeze rolls, a porous plate located between said rigid members and being positioned at an angle with respect to the lower conveyer so that the upper conveyer as it passes thereunder is forced against the lower conveyer thereby deaerating the solid, means for driving the squeeze rolls and means for removing the compressed solid from the conveyers after it has passed between said rolls.

3. An apparatus for compressing a finely divided solid which comprises a pair of squeeze rolls, two endless conveyers positioned face to face one above the other so that the adjacent faces of the conveyers are substantially parallel laterally, the upper conveyer being shorter than the lower, said conveyers being driven by the squeeze rolls between which the conveyers pass, the upper conveyer being pervious to air, feed means for the solid, said means being located on the lower conveyer at a point beyond the end of the upper conveyer whereby the solid is fed between the adjacent conveyer faces at the end of the upper conveyer, a supporting platform extending beneath that face of the lower conveyer which is adjacent the upper conveyer from a point adjacent to where the solid is fed between the conveyer faces to a point adjacent the squeeze rolls, a rigid member extending parallel to and adjacent each edge of the upper conveyer and so positioned with respect to the support platform that the edges of the upper conveyer are pressed against the adjacent face of the lower conveyer so that a seal is formed, rigid means extending laterally between the rigid members, the rigid means being so positioned that they force the upper conveyer close to the lower conveyer thereby deaerating the solid, means for removing the solid from the conveyers after it has passed between the squeeze rolls and means for driving the squeeze rolls.

4. An apparatus for compressing a finely divided solid comprising a pair of squeeze rolls positioned one above the other, one of said rolls being larger than the other and at least one of the rolls being rubber coated, two endless conveyers positioned face to face one above the other so that the adjacent faces of the conveyers are substantially parallel laterally, the upper conveyer being shorter than the lower, said conveyers being driven by the squeeze rolls between which the conveyers pass, the upper conveyer being pervious to air, feed means for the solid located at a point beyond the end of the upper conveyer whereby the solid is fed between the adjacent conveyer faces at the end of the upper conveyer, a supporting platform extending beneath that face of the lower conveyer which is adjacent the upper conveyer from a point adjacent the feed end of the upper conveyer to a point adjacent the squeeze rolls, a rigid member extending parallel to and adjacent each edge of the upper conveyer and so positioned with respect to the support platform that the edges of the upper conveyer are held against the adjacent face of the lower conveyer so that a seal is formed from a point adjacent the feed end of the upper conveyer to a point adjacent the squeeze rolls, rigid means extending laterally between the rigid members, said rigid means being so positioned that as the upper conveyer passes under said means it is forced close to the adjacent face of the lower conveyer thereby deaerating the solid, means for removing the solid from the conveyer surfaces after it has been compressed by passing between the squeeze rolls and means for driving the squeeze rolls.

5. An apparatus for compressing and pelletizing a finely divided solid which comprises a pair of squeeze rolls, two endless conveyers positioned face to face one above the other so that the adjacent faces thereof are substantially parallel laterally, the upper conveyer being shorter than the lower, said conveyers being driven by the squeeze rolls between which the conveyers pass, the upper conveyer being pervious to air, feed means for the solid located on the lower conveyer at a point beyond the end of the upper conveyer so that the solid is fed between the adjacent faces of the conveyers at the end of the upper one, a supporting platform extending beneath that part of the lower conveyer which is adjacent the upper conveyer from a point where the solid is fed between the conveyer faces to a point adjacent the squeeze rolls, a rigid member extending parallel to and adjacent each edge of the upper conveyer and so positioned with respect to the support platform that the edges of the upper conveyer are pressed against the lower one so that a seal is formed, rigid members extending laterally between said first rigid members, the latter rigid members being positioned so that they force the upper conveyer close to the lower conveyer thereby deaerating the solid, means for removing the solid from the conveyers after it has passed through the squeeze rolls, means for driving the squeeze rolls, a cylinder adapted to receive the compressed solid, means for conveying the compressed solid into the cylinder and means for rotating the cylinder whereby the compressed solid is converted into substantially dust-free pellets.

6. An apparatus for compressing and pelletizing a finely divided solid comprising a pair of squeeze rolls positioned one above the other, one of said rolls being larger than the other and at least one of the rolls being rubber coated, two endless conveyers positioned one above the other so that the adjacent faces of the conveyers are substantially parallel laterally, the upper conveyer being pervious to air and being shorter than the lower conveyer, said conveyer being driven by the squeeze rolls between which the conveyers pass, feed means for the solid located at a point beyond the end of the upper conveyer whereby the solid is fed between the adjacent conveyer faces at the end of the upper conveyer, a support platform extending beneath that face of the lower conveyer which is adjacent the upper conveyer from a point adjacent the feed end of the upper conveyer to a point adjacent the squeeze rolls a rigid member extending parallel to and adjacent each edge of the upper conveyer and so positioned with respect to the support platform that the edges of the upper conveyer are held against the adjacent face of the lower conveyer so that a seal is formed from a point adjacent the feed end of the upper conveyer to a point adjacent the squeeze rolls, rigid means extending laterally between the rigid members, said rigid means being so positioned that as the upper conveyer passes under said means it is forced close to the adjacent face of the lower conveyer thereby deaerating the solid, means for removing the solid from the faces of the conveyers after it has been compressed by passing between the squeeze rolls, means for driving the squeeze rolls, a cylinder adapted to receive the compressed solid, means for conveying the solid into the cylinder and means for rotating the cylinder whereby the compressed solid is converted into substantially dust-free pellets.

References Cited in the file of this patent

UNITED STATES PATENTS

| | | |
|---|---|---|
| 1,949,175 | Netzel | Feb. 27, 1934 |
| 2,067,401 | Lassman | Jan. 12, 1937 |
| 2,161,308 | Murphy et al. | June 6, 1939 |
| 2,167,432 | Cox et al. | July 25, 1939 |
| 2,483,638 | Howe | Oct. 4, 1949 |
| 2,569,226 | Carter | Sept. 25, 1951 |
| 2,635,301 | Schubert et al. | Apr. 21, 1953 |

UNITED STATES PATENT OFFICE
Certificate of Correction

Patent No. 2,867,843 January 13, 1959

Harold L. Browne et al.

It is hereby certified that error appears in the printed specification of the above numbered patent requiring correction and that the said Letters Patent should read as corrected below.

Column 4, line 41, for "method" read —apparatus—.

Signed and sealed this 28th day of April 1959.

[SEAL]

Attest:
T. B. MORROW,
*Attesting Officer.*

ROBERT C. WATSON,
*Commissioner of Patents.*